Dec. 14, 1971   J. E. LOWDER ET AL   3,626,780
TRANSMISSION CONTROL QUADRANT AND LOCK ASSEMBLY
Filed Jan. 30, 1970   2 Sheets-Sheet 1

INVENTORS
JAMES E. LOWDER
GARY H. PERRY

BY Cushman, Darby & Cushman
ATTORNEYS

INVENTORS
JAMES E. LOWDER
GARY D. PERRY
BY Cushman, Darby & Cushman
ATTORNEYS 3,626,780
TRANSMISSION CONTROL QUADRANT
AND LOCK ASSEMBLY
James E. Lowder and Gary D. Perry, Lubbock, Tex., assignors to Johnson Manufacturing Company, Lubbock, Tex.
Filed Jan. 30, 1970, Ser. No. 7,202
Int. Cl. G05g 9/02
U.S. Cl. 74—473 R          6 Claims

ABSTRACT OF THE DISCLOSURE

A guide and locking device for a movable control lever includes a slotted guide plate through which the lever extends. A manually operated shaft carries a flange which upon rotation of the shaft to a lock position blocks movement of the lever out of a preselected guide slot. The shaft is resiliently held in either its lock or unlock position by a spring biasing arrangement which urges the shaft in an axial direction so as to insert a second flange carried thereby into either a lock or unlock slot in a fixed plate.

---

The present invention relates to a poistioning and locking assembly for a machine control lever or the like and particularly to an assembly which permits the lever to be isolated and locked in a selected position. Although the invention is particularly suitable as a safety device for locking a gear shift lever in a neutral position, the arrangement is applicable to the locking of any movable lever in any selected position.

More specifically the present invention utilizes a unique arrangement of a slotted shift guide plate and a manually operable position-locking means mounted in operative relationship with the plate and lever for locking the lever in a given position, such as a neutral position. The control lever is thus completely isolated and locked into the neutral position and provides a definite safety factor since the lever is firmly held in place. The locking means preferably includes a spring-biased detent arrangement which releasably holds the locking means in its lock position.

The invention will be further understood from the following detailed description of an illustrative embodiment taken with the drawings in which.

Figure 1:
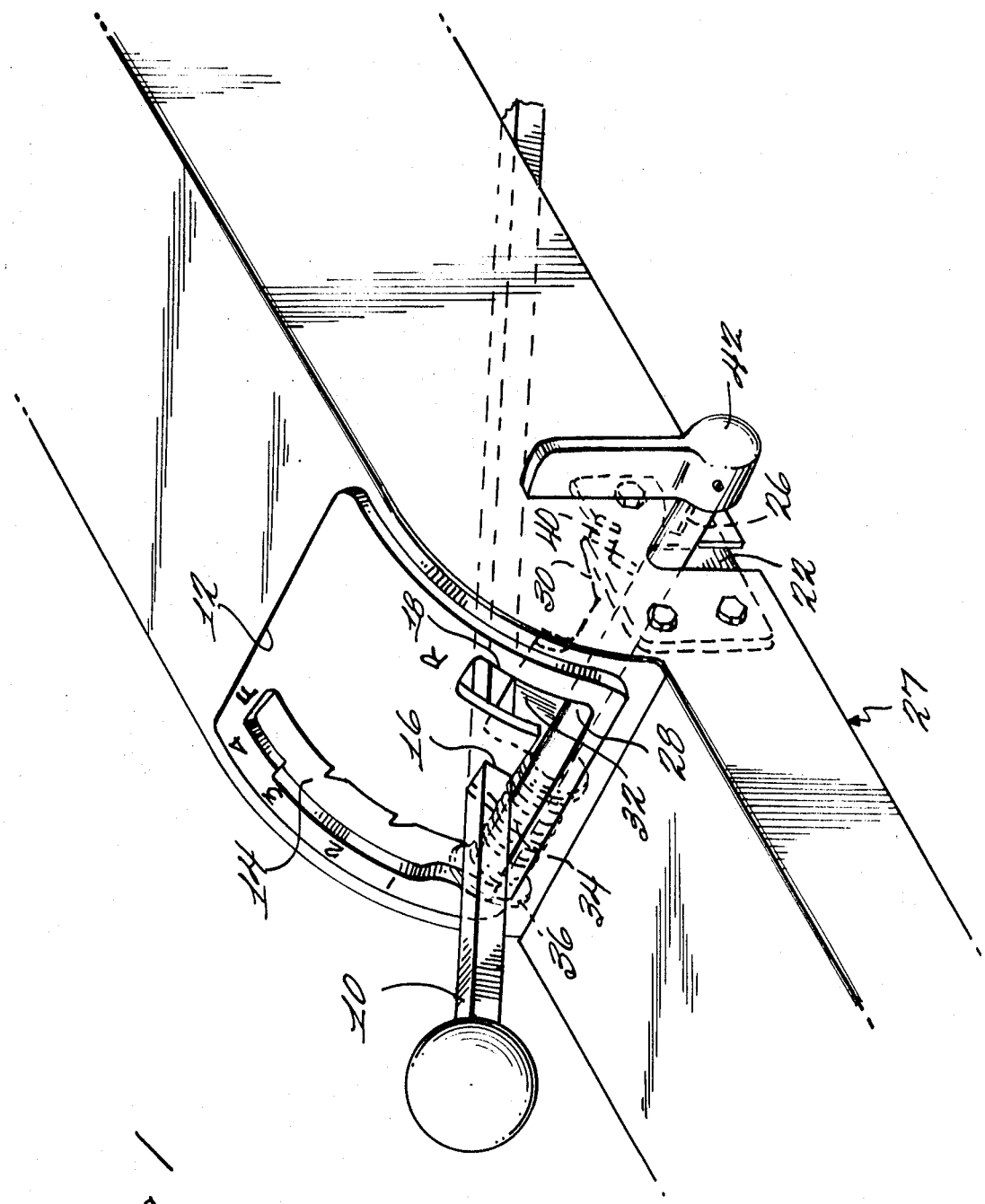
FIG. 1 is a perspective view, partly in phantom, of a positioning and locking assembly embodying the principles of the invention.

With reference now to the drawings, wherein like reference characters designate like or corresponding parts throughout the several views, there is shown a movable control lever 10 which may be, for example, a gear shift lever for the transmission of a vehicle such as earth moving equipment or the like. The lever 10 extends through a fixed shift quadrant plate 12 having a plurality of guide slots 14, 16, 18 and 20 therein, the slots 14 and 18 defining, respectively, forward and reverse positions of the lever 10. The slot 20 defines a neutral position of the lever as it passes from one drive position to the other, and the slot 16 defines a locked neutral position. As shown, the slots are formed in a generally E-shaped configuration, although the invention is not limited to this arrangement. A transversely extending locking plate 22 is mounted below and adjacent to the shift quadrant plate 12 and includes a lock slot 24 and an arcuately-spaced unlock slot 26 therein. The plates 12 and 22 are supported in any suitable manner, as by being secured to an existing channel member 27.

Figure 2:
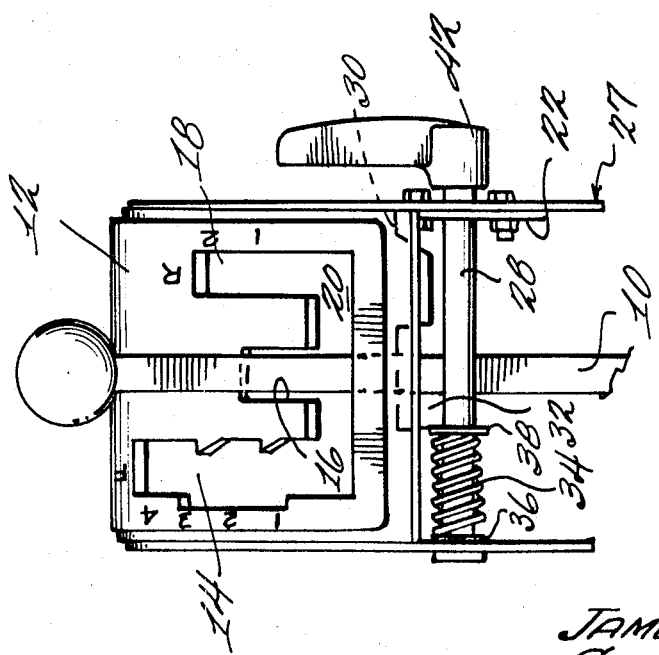
FIG. 2 is a front elevational view of the device shown in FIG. 1.

The locking plate 22 is part of a neutral position locking means which also includes a lock shaft 28 and handle assembly. The lock shaft 28 is disposed below the quadrant plate 12 and extends through the lock plate 22 as best seen in FIG. 2. The shaft 28 is mounted for rotation about its own axis and for limited sliding movement along its axis. Extending from the shaft 28 is a latch flange 30 and a flag flange 32, the former being located near the lock plate 22 and the latter being located opposite the lock slot 16 so as to be capable of holding the lever 10 in that slot. A compression coil spring 34 provided with end washers 36 and 38 surrounds the shaft 28 at a location between the flag flange 32 and the adjacent leg of the channel member 27 so that normally the spring 34 urges the shaft 28 to the right as viewed in FIG. 2. This causes a projection 40 on the latch flange 30 to enter one of the slots 24 or 26 depending on the rotational position of the shaft 28. In either event the shaft 28 is locked against rotation until it is manually pushed to the left, against the action of the spring 34.

Figure 3:
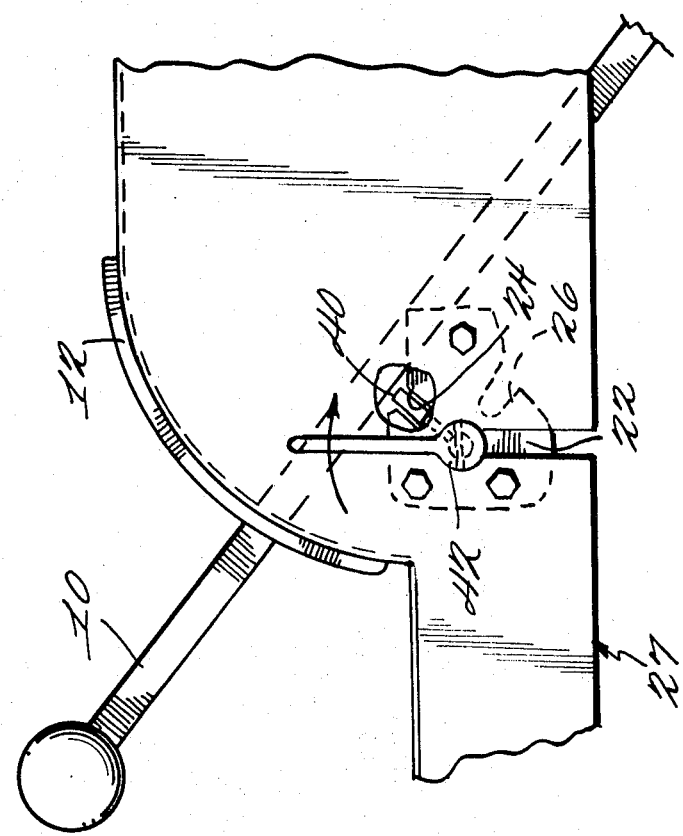
FIG. 3 is a side elevational view of the device.

In the operation of the device the projection 40 of the latch flange 30 will normally be located in the unlock slot 26. In this rotational position of the shaft 28 the flange 32 lies outside the path of travel of the shift lever 10 to permit free movement of the latter along any of the slots 14, 16, 18 and 20 while the vehicle is in operation. When it is desired to cease operation or movement of the vehicle and to lock the gear shift lever 10 into the neutral position, the operator moves the shift lever 10 into the slot 16 as shown in the drawings. He then pushes the handle 42 in an axial direction with respect to the shaft 28 against the action of the spring 34. This axial movement of the shaft 28 results in the movement of the latch projection 40 out of the unlock slot 26. The handle 42 and shaft 28 are then rotated manually in a counterclockwise direction as viewed in the drawings until the flag flange 32 arrives at a position closely adjacent or in engagement with the lower surface of the gear shift lever 10. The handle 42 is then released so that the spring 34 forces the shaft 28 to the right and causes the latch projection 40 to enter the lock slot 24 in the locking plate 22 as seen in FIGS. 1 and 3. In this position of the parts the sides of the slot 16 in the quadrant plate 12 prevent lateral movement of the shift lever 10, and the flange 32 prevents movement of the lever 10 out of the slot 16. As a result the lever 10 is completely isolated and locked into the neutral position.

When it is desired to unlock the lever 10 and to remove it from the neutral position the handle 42 is again pushed in the axial direction of the shaft member 28 against the spring 34 so as to withdraw the flange projection 40 from the lock slot 24. The handle 42 is then rotated in a direction shown by the arrow in FIG. 3 until the latch flange 30 is aligned with the unlock slot 26 whereupon the handle 42 is released to allow the flange projection 40 to enter the unlock slot 26.

It will be seen from FIG. 2 that the arrangement of the guide slots 14, 16, 18 and 20 and their relationship with the flanges 30 and 32 is such that the lever 10 is movable from either of the drive slots 14 and 18 to the neutral slot 20, even if the shaft 28 has been inadvertently rotated to a lock position during operation of the vehicle. That is, the flange 32 cannot lock the lever 10 in either forward or reverse.

Accordingly it will be seen that the invention provides for a positioning and locking assembly for locking a gear shift lever in a predetermined position to completely isolate the lever in the desired position and to prevent its accidental movement from that position.

It will be evident that modifications and variations of the present invention are possible in light of the above teachings.

What is claimed is:

1. A transmission lever guide and lock assembly for selectively positioning and locking a movable transmission control lever in a preselected position, comprising: a lever guide plate through which the lever extends, said plate having a plurality of interconnected guide slots along which the lever is movable, said slots forming a generally E-shaped configuration wherein the end legs of the E define drive positions of the lever and wherein the body and center leg of the E define neutral positions of the lever; and movable locking means mounted for movement between a lock position in which movement of the lever along a preselected one of said slots is prevented and an unlock position in which movement of the lever along said predetermined slot is permitted, said locking means when in its lock position being disposed to block movement of the lever out of the center leg of the E but at the same time lying outside the path of the lever as it moves from either end leg of the E to the body of the E.

2. A transmission lever guide and lock assembly for selectively positioning and locking a movable transmission control lever in a preselected position, comprising: a lever guide plate through which the lever extends, said plate having a plurality of interconnected guide slots along which the lever is movable; and movable locking means mounted for movement between a lock position in which movement of the lever along a preselected one of said slots is prevented and an unlock position in which movement of the lever along said predetermined slot is permitted, said locking means including a rotatable shaft carrying a lever-engageable flange which moves between said lock position and said unlock position upon manual rotation of said shaft, said locking means further including detent means for releasably holding said shaft in the rotatable positions corresponding to the lock and unlock means and spring-biasing means releasably maintaining said detent means in engagement.

3. An assembly as in claim 2 wherein said detent means includes a fixed plate disposed transversely to said shaft and an axially extending projection carried by said shaft, said fixed plate having slots for receiving said projection in positions corresponding to the lock and unlock positions of said shaft.

4. A transmission lever guide and lock assembly for selectively positioning and locking a movable transmission control lever in a preselected position, comprising: a slotted lever guide plate through which the lever extends, said plate having a slot pattern having a first portion corresponding to a first range of lever positions and a second portion corresponding to a second range of positions; lever locking and unlocking means operable in a locking mode to block movement of the lever from one of said slot portions while at the same time permitting movement of the lever out of the other slot portion and into said one slot portion, and operable in an unlocking mode to permit free movement of the lever into and out of the slot portions.

5. A lever guide and lock assembly as in claim 4 wherein said locking and unlocking means includes a movable element which in the locking mode is disposed so as to be engaged by the lever when the latter is intermediate the extremes of said one slot portion whereby the lever may enter said one slot portion.

6. A lever guide and lock assembly as in claim 5 wherein said movable member is a projection on a shaft rotatable between a lock position and an unlock position, said assembly further including detent means for releasably holding said shaft in the lock position.

References Cited

UNITED STATES PATENTS 3,135,234  6/1964  Turnidge _____ 74—533 UX
3,470,771  10/1969  Houk _____ 74—473 X MILTON KAUFMAN, Primary Examiner U.S. Cl. X.R.
74—491, 526, 533